April 14, 1925.

H. J. JONES

UNIVERSAL JOINT

Filed Oct. 17, 1923　　2 Sheets-Sheet 1

1,533,425

Witness
John Milton Jester

Inventor
Harry J. Jones
By H. A. Gourick
Attorney

April 14, 1925.　　　　　　　　　　　　　　　1,533,425
H. J. JONES
UNIVERSAL JOINT
Filed Oct. 17, 1923　　　2 Sheets-Sheet 2

Inventor
Harry J. Jones

Witness
John Milton Jester

By D. R. Gourick
Attorney

Patented Apr. 14, 1925.

1,533,425

UNITED STATES PATENT OFFICE.

HARRY JAMES JONES, OF SAN ANGELO, TEXAS.

UNIVERSAL JOINT.

Application filed October 17, 1923. Serial No. 669,095.

*To all whom it may concern:*

Be it known that I, HARRY J. JONES, a citizen of the United States, residing at San Angelo, county of Tom Green, and State of Texas, have invented certain new and useful Improvements in Universal Joints, of which the following is a specification.

This invention relates to shaft connections, particularly those of the tumbling type, and has for its object the provision of a novel universal joint for use in connection with the drive shafts of automobiles or other mechanisms where relative lateral movement must be permitted, the joint embodying in its construction ball members which will operate as the driving connection and which will, at the same time, act to reduce friction to the minimum so that excessive wear will be prevented or avoided even though the lubrication might fail or be inadequate.

An important object is the provision of a device of this character which is provided with means for preventing or at least taking up all or a portion of the end play so that proper action will be insured.

An additional object is the provision of a joint of this character which will be simple and inexpensive to manufacture, easy to assemble and associate with other elements of a mechanism, which will be efficient and durable in service and a general improvement in the art.

With the above and other objects and advantages in view, the invention consists in the combination and arrangement of parts to be hereinafter more fully described and claimed and illustrated in the accompanying drawings in which:

Figure 1:
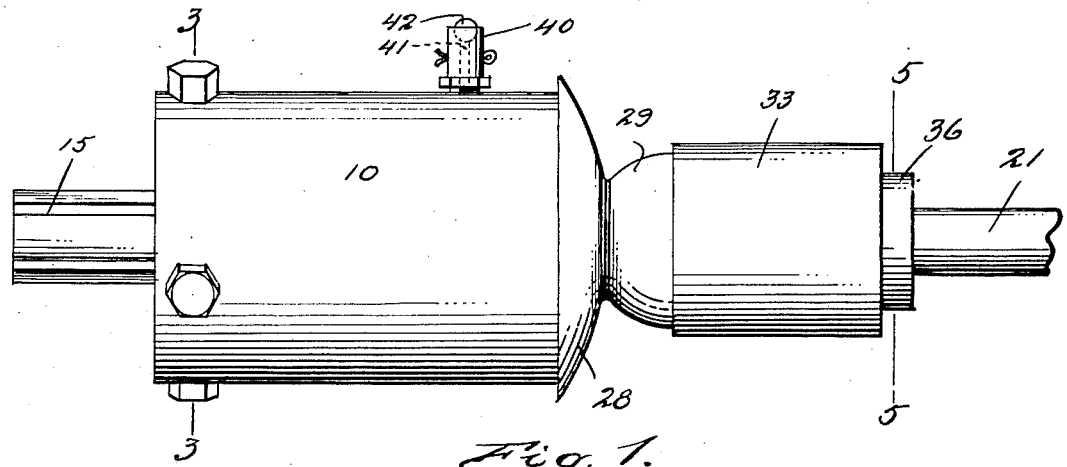
Figure 1 is a side elevation of the complete device.
Figure 2:
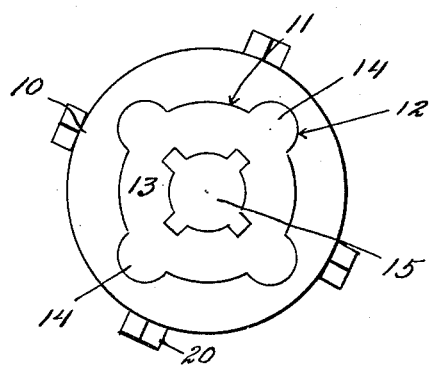
Figure 2 is an end view.
Figure 3:
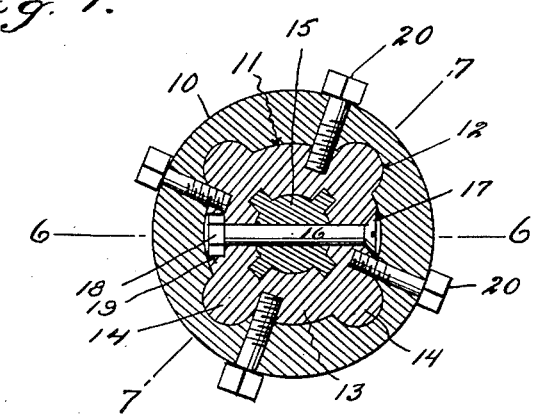
Figure 3 is a cross section on the line 3—3 of Figure 1.
Figure 4:
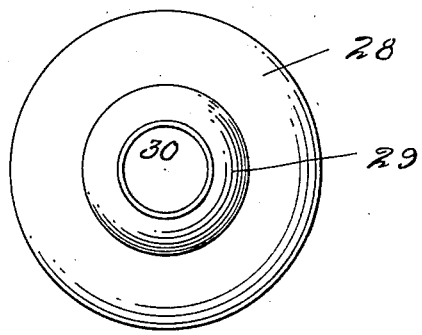
Figure 4 is a detail view of the curved cap.
Figure 5:
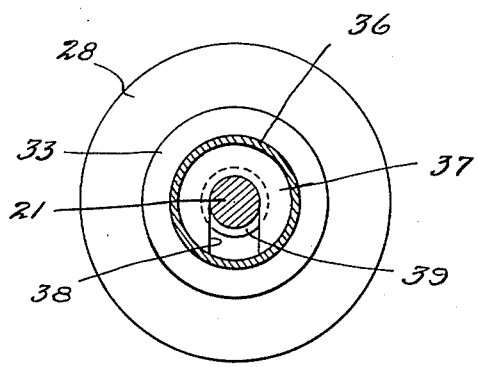
Figure 5 is a detail cross section on the line 5—5 of Figure 1.
Figure 6:
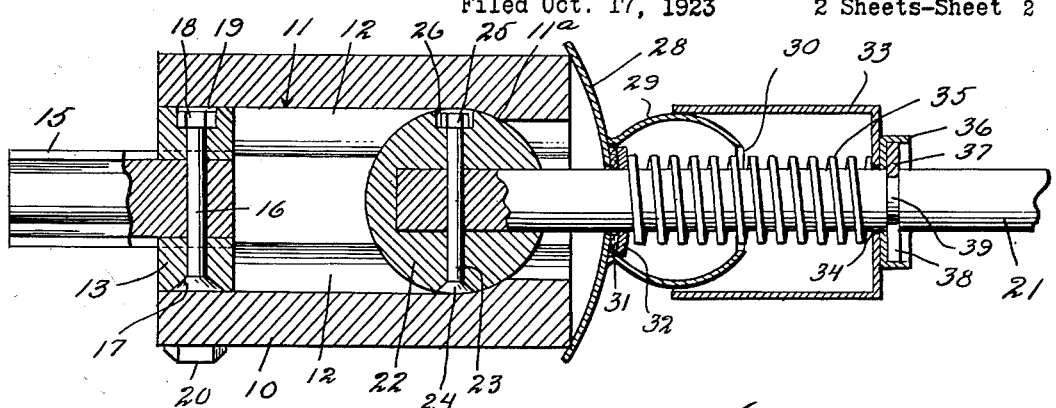
Figure 6 is a longitudinal section on the line 6—6 of Figure 3.
Figure 7:
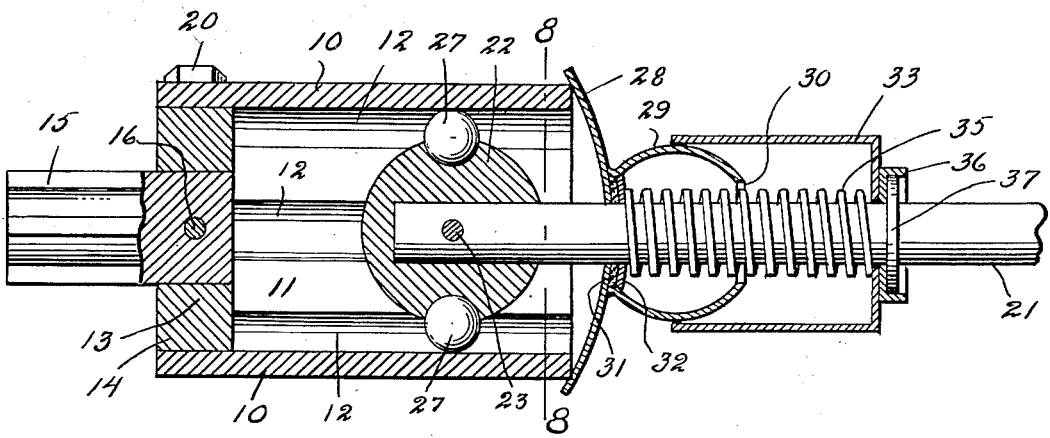
Figure 7 is a longitudinal section on the line 7—7 of Figure 3.
Figure 8:
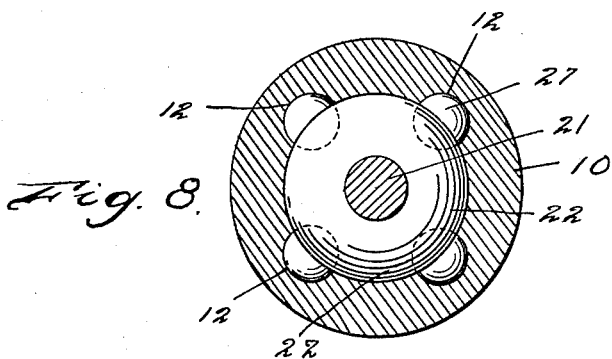
Figure 8 is a cross section on the line 8—8 of Figure 7.

Referring more particularly to the drawings, I have shown the device as comprising a cylindrical body 10 which is hollow and which has its bore 11 formed at one end with stop shoulders 11ª for a purpose to be described. This body is formed on its inner periphery with a plurality of longitudinally extending channels 12 which extend from end to end thereof.

Engaged within one end of the body is a disk or plug 13 formed with curved projections 14 on its periphery conformingly engaged within the curved channels 12. This plug or disk is formed centrally with an opening within which is conformingly received one end of a spline which is here shown as having four ribs but which might have any other number of ribs or which may be merely keyed or provided with facets so that it will be capable of non-rotative engagement within a corresponding socket within the end of a rotary shaft or other element, not shown. For holding the spline associated with the disk or plug, I provide a bolt 16 which passes diametrically through the plug and spline and which has its head 17 countersunk and its clamping nut 18 located within a recess 19 so that the ends of the bolt will not project beyond the periphery of the plug. The plug is held within the body 10 by a plurality of cap screws or studs 20 which are screwed to the body and which engage within sockets in the plug.

The numeral 21 represents a driving or driven shaft, as the case may be, which shaft extends longitudinally of the body 10 and carries a ball head 22 secured thereto by a transverse bolt 23 having its head 24 countersunk thereinto and carrying a nut 25 located within a recess 26. This ball head 24 is formed with a plurality of sockets of substantially semispherical shape within which are located balls 27 which are disposed within the longitudinally extending channels 12 of the body.

As stated above, one end of the body is closed by the plug 13 and engaged upon the other end thereof is a cap 28 which is partially spherical in form and upon which is formed a partially spherical head 29. At its center the cap is formed with a hole 30 for the passage of the shaft 21, and disposed against the outer side of the cap within the confines of the head 29 is a felt washer 31 against the outer side of which is disposed a metallic washer 32 fitting closely about the shaft 21.

Located exteriorly of the head 29 is a shell 33 having one end 34 closed except for a central hole for the passage of a shaft 21, and encircling the shaft is a coil spring 35 which bears against the metallic washer 32 and against the inside of the closed end of the shell 33.

For holding the parts in position and taking up the end thrust to a certain extent, I provide a flanged collar 36 located against the closed end of the shell 33 and within which is disposed a disk 37 having a slot 38 engaged within a peripheral groove 39 in the shaft 21. It is of course obvious that to install the locking disk and collar, it is necessary to press upon the shell 33 and compress the spring 35 so that the disk 37 may be slipped into the groove 39, subsequently to which release of the pressure upon the spring will permit the shell and collar 36 to move outwardly so that the disk 37 will be engaged within the collar and prevented from lateral displacement with respect to the shaft.

In insuring lubrication at all times, I provide an oil cup 40 which is screwed into a suitable hole in the body 10 and which has a passage 41 normally closed by a ball 42 held shut by a tension spring, not shown. The details of this specific oil cup are entirely immaterial as it is of a well known type.

In use it is of course apparent that when rotative movement is imparted either to the spline 15 or the shaft 21, as the case may be, the other will be positively driven owing to the engagement of the balls 27 within the longitudinal grooves or channels 12. Furthermore, angular movement of the shaft is permitted as the ball head 22 may rock within its bore 11. Quite naturally the balls all tend to reduce friction while insuring a positive lock or drive connection. The spring 35 operates to hold the ball head 22 against the stop shoulders 11ª and thus take up any end thrust or tendency to move longitudinally. The cap 28 excludes dust, water or foreign matter from the open end of the body 10 and the felt washer 31 prevents leakage of lubricant around the shaft. Actual practice has demonstrated that there is great freedom and ease of movement without rotational or longitudinal play, while at the same time there is great strength and durability which are prime requisites to a satisfactory universal joint construction.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. In a universal joint structure, a body having a bore formed with longitudinal channels, a plug detachably secured within one end of the body and formed with projections conformingly fitting within said channels, a spline carried by the plug, a shaft extending into the body at the open end thereof and carrying a ball head conformingly engaging within the bore and formed with sockets, members engaged within the sockets and said channels, the bore having its end at the open end of the body reduced in diameter to provide stop means preventing disengagement of the head from the bore.

2. In a universal joint structure, an elongated body having a bore and formed in the wall of said bore with a plurality of longitudinal channels curved in cross section, a plug within one end of said body formed with projections conformingly fitting within said channels, securing members passing through the body and into the plug for holding the latter, a spline extending centrally through said plug, a securing member passing through the plug and through the spline, a shaft extending longitudinal into the body and carrying a ball head conformingly engaging within the bore and formed with sockets, balls within the sockets fitting within the channels, and means for limiting longitudinal movement of the ball head.

3. In a universal joint structure, a body having a bore and formed in the wall of the bore with longitudinal channels curved in cross section, a plug fitting within the bore at one end of the body and having projections conformingly engaging within said channels, cap screws threaded through the body and into the plug for holding the latter, a spline extending centrally through the plug, a securing bolt passing through the plug and the spline, a shaft extending into the other end of the body, a head on said shaft, and means on the head engaging within said channels for providing a drive connection.

4. In a universal joint structure, a body closed at one end and open at the other, a spline at the closed end for connection with a rotary element, said body having a bore having its wall provided with longitudinal channels, stop shoulders at the opening end of the body, a shaft extending longitudinally into the body and carrying a ball head rockable within the bore and formed with sockets, balls engaged within said sockets and said channels, a cap engaged upon the shaft and closing the open end of the body, the cap having a spherical head, a shell surrounding the shaft and said spherical head, and a spring enclosed within the cap and shell for holding said ball head in engagement with said stop shoulders to prevent longitudinal play.

5. In a universal joint structure, a body provided at one end with a driving spline and having a bore formed in its wall with channels, a shaft extending into the body and carrying a ball head formed with sockets, balls within the sockets engaging within the channels, stop shoulders for preventing longitudinal movement of the ball head in one direction, a curved cap normally closing the open end of the body and having a spherical projection, a shell surrounding said projection, a stop collar on the shaft, and a spring surrounding the shaft and bearing against said shaft and the shell for preventing endwise play.

6. In a universal joint, an elongated hollow body formed internally with channels, a shaft extending into one end of the body and terminating in a ball head, balls carried by said head and engaging within said channels, a plug detachably secured within one end of the body and having projections fitting within the channels, and a spline carried by the plug.

7. In a universal joint, an outer member formed with a bore and channels in the wall of the bore, a shaft carrying a head within the bore, means on the head engaging within the channels for providing a driving connection, a plug detachably mounted within one end of the outer member, securing members passing through the outer member and into the plug, and a spline detachably connected with the plug.

8. In a universal joint, an elongated hollow body formed with channels, a spline member at one end of the body, a shaft extending into the other end of the body and carrying a rod equipped with driving elements engaged within the channels, a curved plate member on the shaft engaging said second named end of the body and formed with a spherical hollow projection, a shell detachably secured upon the shaft and telescoping said spherical projection, and a coil spring surrounding the shaft and bearing against said plate member and against the outer end of the shell.

In testimony whereof I hereto affix my signature.

HARRY JAMES JONES.